June 22, 1965
A. W. HUGHES
3,189,939
DEAERATING MACHINE FOR SAUSAGE BATTER OR THE LIKE
Filed Oct. 24, 1963
2 Sheets-Sheet 2
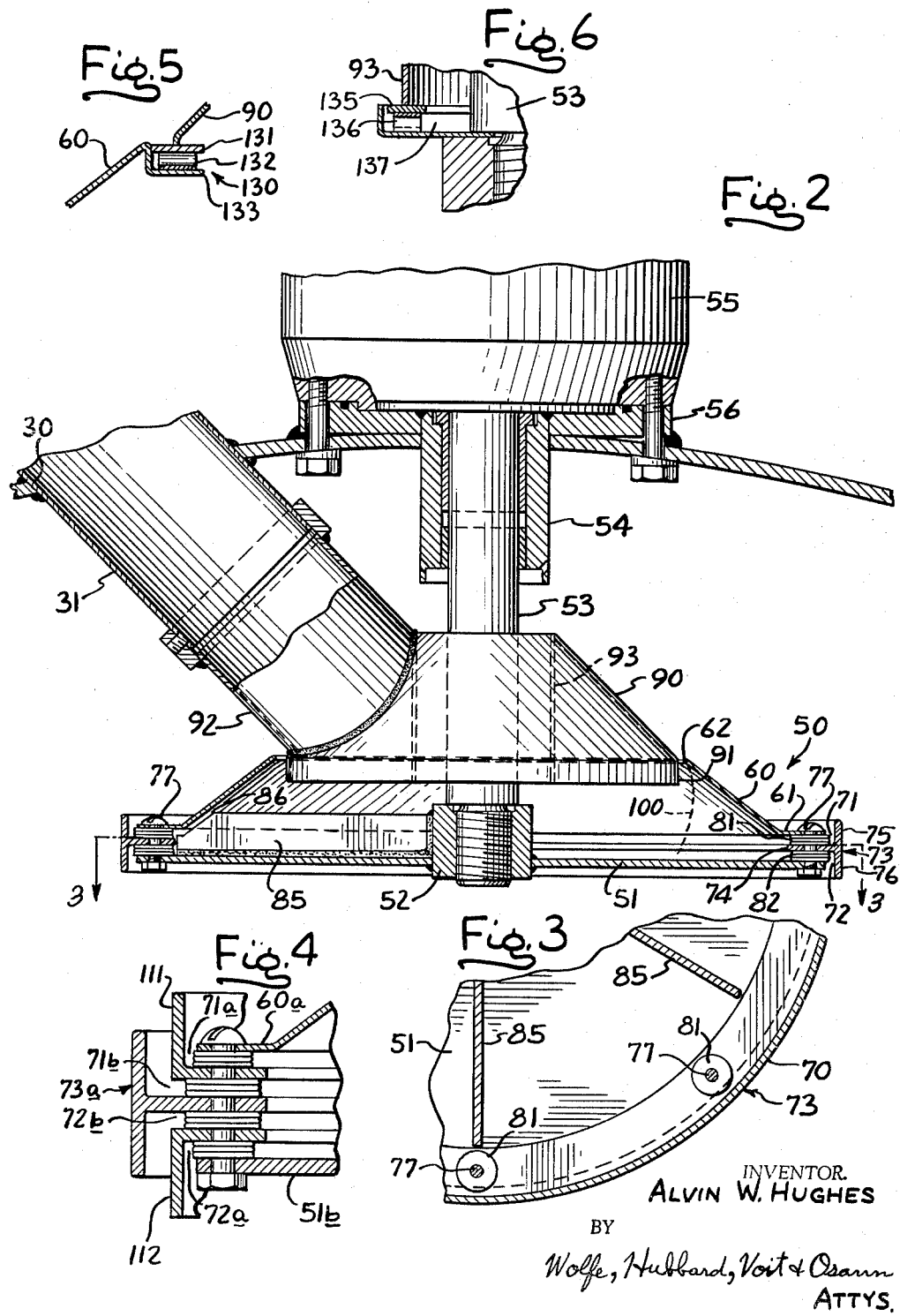
INVENTOR.
ALVIN W. HUGHES
BY
Wolfe, Hubbard, Voit & Osann
ATTYS.

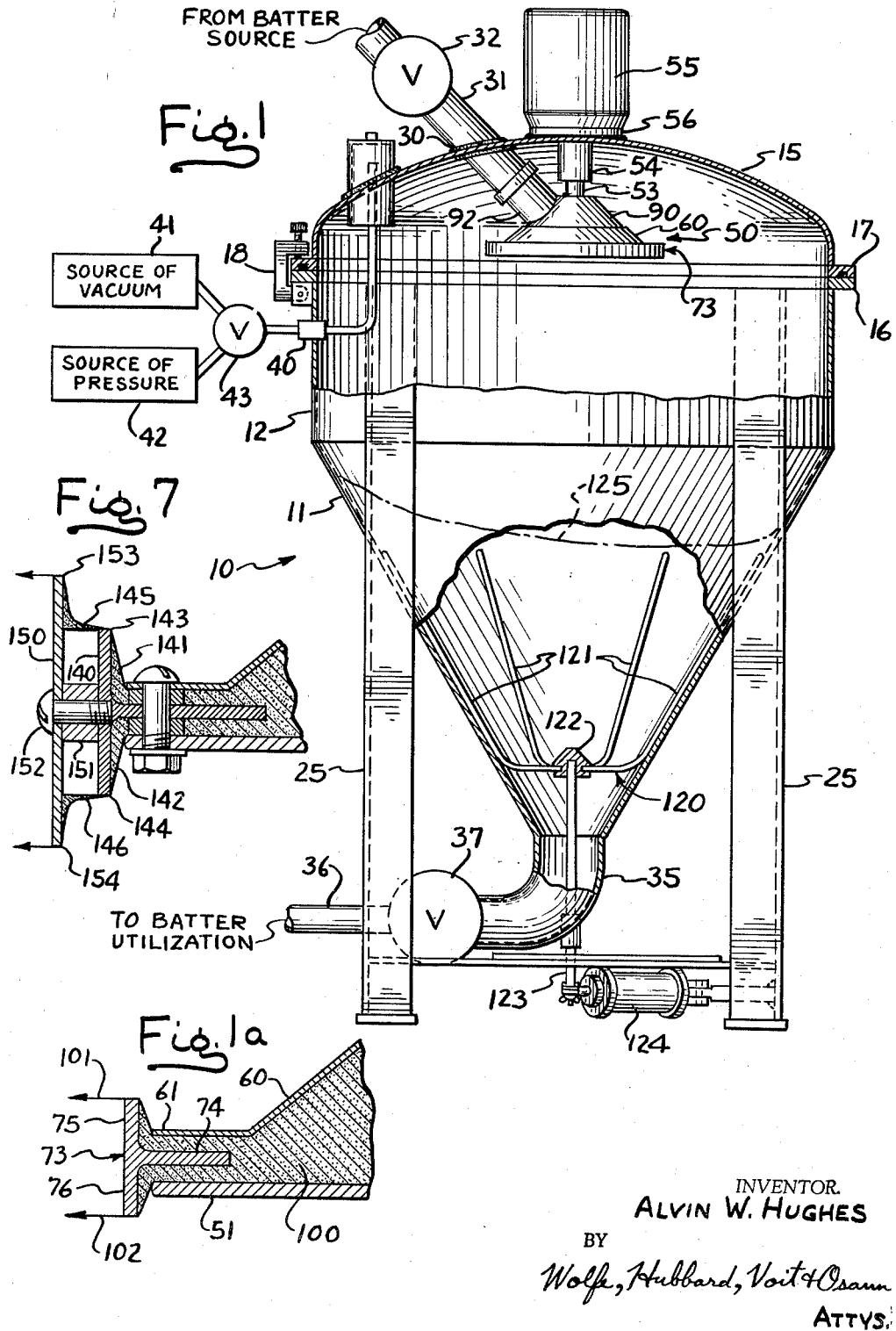

United States Patent Office 3,189,939
Patented June 22, 1965

3,189,939
DEAERATING MACHINE FOR SAUSAGE
BATTER OR THE LIKE
Alvin W. Hughes, 4 N. 194 Church Road,
Bensenville, Ill.
Filed Oct. 24, 1963, Ser. No. 318,725
11 Claims. (Cl. 17—35)

The present invention relates to means for deaerating sausage batter or the like.

It is an object of the present invention to provide a deaerating machine for sausage batter and the like having improved deaerating efficiency and capable of producing a dense product at a high production rate. It is a related object to provide a deaerating machine for sausage batter or the like which is capable of operating over a wide viscosity range and which is especially suited for treating batters which are highly viscous and which have a high fiber content.

It is another object to provide a vacuum-type deaerating machine which exposes a maximum area of product to the evacuated atmosphere and which insures that the entrapped air is at sufficiently shallow depth for easy escape and which is therefore effective even at high flow velocity where time of treatment is necessarily short. It is a more specific object of the present invention to provide a deaerating machine in which the incoming product is formed into a thin sheet or layer to facilitate treatment but which does not rely upon vacuum in the formation of the layer.

It is an object of the invention in one of its aspects to provide a deaerating machine which is capable of continued operation without any care or attention on the part of the operator without risk of overflow or other malfunction.

Other objects and advantages of the invention will become apparent upon reference to the following description and the drawings which are appended here to in which:

FIGURE 1 is an elevational view of a deaerating machine constructed in accordance with the present invention and with portions shown broken away to reveal the internal construction.

FIG. 1a is a fragmentary view of the edge of the impeller showing the radial extrusion path.

FIG. 2 is an enlarged cross sectional view of the impeller used in the machine of FIG. 1.

FIG. 3 is a fragmentary section taken along the line 3—3 in FIG. 2.

FIG. 4 is a fragmentary section taken through the periphery of the impeller showing a slightly modified form of the invention.

FIGS. 5 and 6 are fragmentary sections taken through the periphery of the upper and lower impeller hood members and the upper hood and shaft respectively showing a seal construction between the chamber and impeller which may be used under certain conditions of operation.

FIG. 7 is a fragmentary view similar to FIG. 1a but showing use of a plurality of stream-deflectors arranged in series at the disc periphery.

While the invention is described herein in connection with certain preferred embodiments, it will be understood that there is no intention to limit the invention to the particular forms shown but, on the contrary, I intend to cover the various alternative modifications and equivalent constructions included within the spirit and scope of the appended claims.

Turning now to the drawings there is disclosed a deaerating machine 10 having a body 11 in the shape of an inverted cone joined to a cylindrical section 12. For the purpose of enclosing the chamber thus formed, a dome-shaped cover 15 is used. The mating flanges 16, 17, secured to the body and cover respectively, may be sealed by a suitable gasket or O-ring and held together by means of a plurality of quick disconnecting clamps 18. The top 15 is preferably hinged to the body by a suitable hinge (not shown). The body is supported in the present instance on a set of vertical legs 25 made of angle iron or the like and which may be four in number, equally spaced about the periphery.

For the purpose of admitting batter from the pressurized source, a batter inlet fitting 30 is provided which communicates with an inlet conduit 31 via an inlet valve 32. To permit discharge of the collected batter, the low end of the conical housing terminates at an elbow 35 which communicates with a discharge conduit 36 via a discharge valve 37.

For cyclically evacuating and pressurizing the chamber, an air fitting 40 is provided communicating with a source of vacuum 41, and a source of pressure 42 via a selector valve 43. It is understood that the term "source of vacuum" is simply used for the sake of convenience and such "source" may, for example, be a vacuum pump capable within a short time of pulling a vacuum within the chamber on the order of 26" of mercury. Analogously, the source of pressure 42 may be a compressor and suitable reservoir so that when the valve 43 is switched to its "pressure" state, full pressure, which may be on the order of 14–25 p.s.i. may be promptly developed.

In accordance with the present invention a rotating impeller or extruding member is provided having a narrow slot about its periphery, and with means for containing the incoming batter deposited thereon so that centrifugal force is built up to produce extrusion in the form of a thin sheet which is slung outwardly from the edge of the impeller into contact with the inner wall of the chamber from whence the batter flows, by gravity, to the lower end of the chamber where it is discharged during the pressure portion of the cycle. Thus, referring to FIGS. 1 and 2, but particularly FIG. 2, there is provided an impeller assembly 50 including a circular disc 51 which is horizontally arranged and which has a hub 52 threadedly secured to a shaft 53 which projects upwardly through a pressure type bushing or seal 54 in the upper wall or cover of the container for driving by a motor 55. The motor may be of the flange mounted type bolted to a flange 56 which is welded or otherwise secured to the top of the chamber.

In order to obtain a sufficient buildup of centrifugal force to effect extrusion of the viscous batter at the periphery of the disc, a hood 60 is provided which is frusto-conical in shape having an outer edge 61 which is spaced from the periphery of the disc 51 and an inner edge 62. The hood prevents the incoming batter from simply spilling over the edge of the impeller and insures that the batter will leave the impeller via the extrusion slots provided at the periphery.

For the purpose of forming parallel extrusion slots, indicated at 71, 72 respectively, an annular separating vane is used. Moreover, in order to partially obstruct the batter flowing from the extrusion slots 71, 72, thereby to thin out the stream flowing from each of the slots, and for the purpose of axially separating the two streams, means are provided at the outlet of the slots for diverting the batter stream at substantially right angles for a short distance of flow. In the present instance the separation, obstruction, and diversion are all accomplished by an annular vane member 73 which is T-shaped in cross section, having a central leg 74 and two arms 75, 76 projecting at right angles thereto. To clamp the vane member 73 in position, a series of peripherally spaced bolts 77 are employed, which may be eight in number, the width of the extrusion slots being determined by the height of washers 81, 82 which are sandwiched in between as shown. Where desired to change the thickness of the extrusion slots to accommodate a batter of different viscosity it is a simple matter to change the thickness or number of the spacing washers.

In order that the batter deposited upon the impeller disc 51 be brought up to speed as soon as possible and for the incidental purpose of rigidifying the disc, the disc has a number of radial vanes 85, which may, for example, be six in number, welded thereto, the vanes preferably stopping short of contact with the hood 60 by a clearance distance 86.

Prior to discussing the operation of the device, more detailed reference may be made to the means for depositing the batter at the center of the impeller. Thus, there is provided, surrounding the shaft 53 and above the impeller, a second or stationary hood 90 which is preferably frustoconical in shape having a depending skirt 91 which extends below the level of the inner edge 62 of the hood 60 which forms a part of the impeller. Batter is fed into the stationary hood 90 via a short length of conduit 92 coupled to the inlet conduit 31. To prevent discharge of the batter directly upon the shaft 53, the stationary hood 90 includes an internal collar 93.

In considering the operation of the impeller it will be assumed that the drive motor 55 is turned on and that the valve 43 is set to pull a vacuum in the chamber. It will also be assumed that the batter inlet valve 32 is open so that batter is free to flow through the inlet conduit by the combined action of the vacuum and pressure at the batter source. Finally it will be assumed that the outlet valve 37 is closed. Under such conditions the batter flowing through the fitting 30 and section of conduit 92 enters the stationary hood 90 where it flows, in the presence of the vacuum, onto the rotating impeller. The batter, indicated at 100 in FIG. 1a, is immediately accelerated up to impeller speed by radial vanes 85, and moves, under the action of centrifugal force, into the annular space defined by the disc 51 and hood 60 at the impeller periphery. It is prevented from spilling over the edge of the disc by the hood 60 and is contained at a high rotative speed so that sufficient centrifugal force is developed therein to insure extrusion through the extrusion slots. In a practical case, using a 12" disc rotated at a speed on the order of 1750 r.p.m., an extrusion force is developed on the order of 18 p.s.i. This is sufficient to produce positive flow of the batter through extrusion slots having a height on the order of 3/16".

The batter flowing out through the extrusion slots is diverted in opposite directions through an angle of approximately 90° by the arms 75, 76 of the vane member 73, the obstruction provided thereby tending to thin down the flowing stream so that the batter is slung outward in sheet-like formation in spaced streams as shown at 101, 102. The sheets are preferably so thin, on the order of a few hundredths of an inch, and in contact with the vacuum atmosphere on both sides, so that any air which may be entrained within the batter is immediately liberated under the action of vacuum. Employing a vacuum on the order of 26" of mercury, it is found that this liberation is practically immediate and substantially complete by the time that the streams 101, 102 strike the wall of the chamber and begin their downward flow under the action of gravity. The sheets may or may not be continuous without affecting the result.

It will be apparent to one skilled in the art that the proportions or relative dimensions shown are simply exemplary and that the specific construction may be changed over relatively wide limits without departing from the present invention. Thus the shape of the hood 60 and its inward extent, may be varied in order to vary the volume of the "collection" space within the impeller. The thickness of the extrusion slot may similarly be varied depending upon the consistency of the batter. Finally, the vane member 73 may be adjusted in radial position in order to determine the degree of obstruction provided and thereby to determine the thickness of the existing streams. This may be done by providing a choice of vane, or by making the vane adjustable in diameter.

If desired, the streams of batter which are slung from the impeller may be further subdivided by employing the construction shown in FIG. 4. Here corresponding parts are indicated by corresponding reference numerals. The construction employs, in addition to the vane member 73a, two additional vane members 111, 112 which are formed of angle stock and which are centered between the vane member 73a and the upper and lower "walls" 60a, 51b of the impeller. Thus, a total of four streams 71a, 71b and 72a, 72b are formed. Since the added members project axially beyond the legs of the vane member 73, all four of the exiting streams are substantially spaced from one another making a total of eight surfaces upon which the vacuum atmosphere may work to remove the entrained air. In order to avoid clogging of the extrusion slots where the batter has a high fiber content, the portions of the vanes which project radially inward may be extended, thus insuring that any fibers which may "catch" on the inner edges of a vane are held safely away from the extrusion slot.

After the batter, now deaerated, strikes the side walls of the chamber, it tends to gravitate downwardly along the wall. To prevent any tendency of the batter to "hang up" on the wall an oscillated spider 120 having legs 121 secured to a hub 122 is provided, driven by a shaft 123 connected to an actuator 124. Oscillation of the spider, by reducing adhesion of the batter to the side walls, permits gravity to operate more freely so that the collected batter tends to form a more well defined "plug" such as indicated at 125.

After the batter has built up to a desired level, or after a predetermined amount of time has elapsed, the chamber is switched to its pressure mode. That is, the selector valve 43 is set to connect the source of pressure 42 to the chamber, the inlet valve 32 is closed and the discharge valve 37 is opened, causing the "plug" of batter 125 to be pushed downwardly by the pressure of the air through the discharge conduit 36. The means for establishing an alternating vacuum-pressure cycle is described in my copending application Serial No. 309,629 filed September 18, 1963 to which cross reference is made.

With regard to drive requirements, the motor 55 may have a rating of approximately 3 horsepower for batter of average viscosity with a rate of treatment on the order of 400 pounds per minute, much higher than is obtainable in a conventional deaerator. Where the batter is particularly viscous a motor of even higher power may be used. Such motor preferably operates constantly with the inlet valve 32 being closed, and with the discharge valve 37 being open, during the pressure portion of the cycle.

In the above discussion, it is assumed that the impeller discharge rate is sufficiently great so as to accommodate the flow of batter through the inlet conduit under the combined influence of vacuum and remotely applied pressure so as to prevent overflow of the peripheral space within the impeller. It is a matter well within the skill of the art to coordinate the inlet rate, for example, by varying the remote pressure and setting of the inlet valve, with the impeller discharge rate. However, the present invention is not limited to free fall of batter into the impeller in the presence of vacuum but includes the alternative of providing a pressure-vacuum seal between the inlet conduit and the impeller. This may be accomplished as shown in FIG. 5 which discloses use of a face seal between the lower and upper hood members 60, 90 and between the upper hood and the shaft. Such a seal may, for example, include a ring sealing member 131 pressed upwardly by a conventional wave spring 132 seated on a ledge 133 formed in the upper edge of the hood 60, allowing relative movement between the sealing ring and the lower edge of the stationary hood 90. A similar seal installed at the inner edge of the stationary hood includes an annular sealing member 135, and wave spring 136 seated in a recess 137. It will be apparent that where the impeller is thus sealed, there is no need to maintain exact coordination between the inlet rate and the running discharge capability of the impeller.

In accordance with one of the aspects of the present invention a plurality of diverter members may be secured to the periphery of the disc for acting in sequence upon the stream, or streams being discharged, so that a stream of batter is required to undergo a plurality of sharp changes in direction during the course of travel. More particularly, deflecting means may be so arranged at the periphery of the disc so that the outwardly slung material is required to follow a stepped path, involving several abrupt changes in direction from the discharge slots to the point where it is actually slung free of the impeller. Thus referring to FIG. 7 there is shown a first annular deflector member 140 interposed in the path of batter streams 141, 142 for causing the streams to undergo a deflection through a sharp angle as, for example, at the corners of 143, 144. Interposed in the outward path of movement of the sheets of batter, indicated at 145, 146, is a second deflector member 150 in the form of an annular strip held in place by spacers 151 and screws 152. Upon striking the second deflector member, the batter is again forced to undergo a sharp change in direction at the corners 153, 154. The batter is thus caused to flow along a path of stepped cross section and still additional deflectors may be provided for increasing the number of steps and thus the number of times that the batter streams are required to flow about a relatively sharp, outwardly presented corner. Tests indicate that substantial deaeration occurs at the region of flow about a relatively sharp corner since the latter not only produces thinning of the stream but also tends to provide motion between the fibers which assists in freeing of minute air bubbles. Moreover, where a plurality of sharp angular bends must be made, less dependence need be placed upon deaeration during the short space of time that the sheets of batter take to reach the wall of the enclosure and thus the enclosure may be made of lesser diameter, for a given production rate, than would otherwise be possible.

In employing the present invention in any one of its aspects, a balance may be struck between the result achieved and the number of physical elements required to achieve it. Even in the case of the simple form of the invention illustrated in FIG. 2, it is possible to readily obtain batter having a density considered ideal by sausage makers, i.e., on the order of 1.034, which is just slightly higher than the density of water. This not only insures a high quality product free of either large or minute air bubbles but it also brings about a number of other practical advantages. In the first place the denser product is found to shorten cooking time by as much as one-half hour, thus increasing smokehouse capacity. In the case of wieners, or other sausage usually heated in water prior to serving, the density assures water submersion so that warming may occur in the shortest possible time.

It is found further that vacuumizing the product by the machine disclosed above increases shelf life; in the case of wieners, for example, the shelf life can be extended from about ten to about eighteen days. Moreover, in this connection, a fully deaerated product permits efficient vacuum packaging, and the holding of a higher degree of vacuum, further increasing the shelf life. Finally, it is found that by subjecting the batter to treatment in the present machine a more homogeneous product is produced, reducing any tendency toward separation of the fat and protein, for example, the collection of fat which sometimes occurs either in a globule or at one end of the wiener during cooking, referred to in the industry as "fatcapping" which is undesirable and which reduces the quality and sales appeal of the product.

In the following claims it will be understood that the term "disc" does not necessarily imply a flat disc and that the term "horizontally arranged," while describing a preferred construction, is not to be strictly construed to cover a disc which is precisely horizontal. Moreover, it will be understood by one skilled in the art that the term "slot" is intended to cover an elongated discharge opening which may be either continuous or discontinuous about the periphery of the disc.

I claim as my invention:

1. In a deaerating machine for sausage batter or the like, the combination comprising an enclosed chamber, means for drawing a vacuum in the chamber, a disc-shaped impeller having a generally conical hood mounted thereon, said hood and disc defining an annular space which is convergent toward the periphery of the disc, and means at the periphery defining a narrow peripheral escape slot which is sufficiently narrow so as to offer resistance to batter flow, means for depositing batter in said space, and means for rotating the disc at a speed which is sufficiently high so that the centrifugal force produced thereby is sufficient to overcome the flow resistance through the slot so that the batter is ejected in the form of a thin sheet and with both sides of the sheet presented to the vacuum atmosphere so that any entrained air is at a shallow depth and capable of release during the time that the batter flows from the periphery of the impeller to the side wall of the enclosure.

2. In a deaerating machine for sausage batter or the like, the combination comprising an enclosed chamber having an upper wall, means for drawing a vacuum in the chamber, an impeller body spaced below the wall and having a central shaft which projects through the wall and which is rotatably sealed therein, drive means mounted on said upper wall for rotating the shaft, an annular hood on the impeller body and spaced with respect to the latter to define an annular space and a narrow peripheral escape slot, means for depositing non-deaerated batter in said annular space, the speed of said driving means being sufficiently great so that the batter in said space is extruded through the escape slot in the form of a thin sheet presenting both of its sides to the vacuum atmosphere in the chamber and sufficiently thin so that the air which is entrapped in the batter is at shallow depth for escape of same, and means at the lower end of the chamber for periodically withdrawing the deaerated batter.

3. In a deaerating machine for deaerating sausage batter or the like, the combination comprising an enclosed chamber, an impeller disc in said chamber, a hood overlying the impeller disc and extending substantially to the periphery thereof to define an annular space, means for depositing non-deaerating batter into said space, means for rotating the disc at a high rate of speed to develop centrifugal force in the batter occupying the annular space, means at the periphery of the disc for defining a pair of parallel peripheral slots for forming two outwardly moving flat streams of batter as the disc is rotated, and means between the slots for relatively diverting the outwardly moving streams of batter axially in opposite directions to form separate thin sheets of batter substantially spaced from one another for removal of entrained air by the vacuum in said chamber as the sheets flow through the air and prior to striking the side walls of the chamber, the chamber being so formed that the batter striking the walls flows downwardly by gravity, and means at the lower end of the chamber for removing the collected aerated batter from the chamber.

4. In a deaerating machine for deaerating sausage batter or the like, the combination comprising an enclosed chamber, means for pulling a vacuum in said chamber, a hollow circular impeller in said chamber having an upper wall and a lower wall therein defining a slot extending about the periphery thereof, means for rotating the impeller at high speed, means for feeding the batter between the walls, a plurality of circular radially extending vanes interposed in the extruding slot and arranged parallel to one another to define a plurality of narrow peripheral extrusion slots, and means on the impeller and located outside of said slots for obstructing the flow of batter therethrough and for diverting the batter so that the batter which flows through said slots is formed into a plurality of axially spaced sheets of batter which are flung outwardly from the impeller for escape of any entrained air therein, and means at the lower end of the chamber for removing the collected deaerated batter.

5. In a deaerating machine for deaerating sausage batter or the like, the combination comprising an enclosed chamber, means for drawing a vacuum in said chamber, an impeller disc arranged substantialy horizontally in said chamber, means defining a pair of peripheral slots at the edge of said disc axially spaced from one another, means for rotating the disc, means for depositing non-deaerated batter on said disc, an annular hood on said disc and convergingly arranged so that the sausage batter deposited on the disc is confined at the periphery of the disc for the building up of centrifugal force therein sufficient to force the batter through said slots, and a narrow annular deflector means for opposing the flow of the outwardly moving streams of batter flowing through said slots and causing the streams to be diverted at substantially 90° following which the batter is slung from the edges of the deflector means in the form of two spaced outwardly flowing sheets of batter, the slots being sufficiently narrow and the opposition provided by deflector means being sufficiently great so that the outwardly flowing sheets of matter are relatively thin with the entrained air at shallow depth for removal of air by the vacuum atmosphere.

6. In a deaerating machine for deaerating sausage batter or the like, the combination comprising an enclosed chamber having means for drawing a vacuum therein, a hollow annular impeller member having an upper wall and a lower wall with the peripheral portions thereof spaced apart to define a peripheral slot, means for rotating the impeller member at high speed, an annular diverting member arranged about the periphery of the impeller member of T shaped cross section having a central leg which extends radially inward into the impeller member so as to define a pair of narrow parallel slots and which has a pair of arms at right angles thereto so that the batter which is deposited in the impeller member is deflected a short distance axially in opposite directions for subsequent discharge in the form of two thin sheets of batter from the ends of the arms.

7. In a deaerating machine for sausage batter or the like, the combination comprising an enclosed chamber, means for drawing a vacuum in said chamber, a horizontally arranged impeller disc in said chamber, a shaft extending through the upper wall of the chamber for driving the disc, means at the periphery of the disc defining a peripheral slot extending around about the disc, a frustoconical hood secured to the periphery of the disc for defining an annular space adjacent said slot so that any batter deposited on the disc is confined so that centrifugal force is built up therein for forcing the same through the slot in a flat stream, a stationary hood of annular shape mounted above the disc and having a skirt which is telescopingly related to the hood on the disc and closely spaced with respect thereto, and conduit means communicating with the stationary hood for feeding non-deaerated batter to the central portion of the disc, said disc having surface projections for causing the batter deposited on the disc to be engaged and brought promptly up to disc speed for flow under the action of centrifugal force to the periphery of the disc and for subsequent extrusion through said slot.

8. In a deaerating machine for deaerating sausage batter or the like, the combination comprising an enclosed chamber having an inlet conduit connected to a source of batter, means for alternately applying vacuum and pressure in said chamber, an impeller disc horizontally arranged in the upper end of said chamber, said disc having an annular hood for enclosing the peripheral portion of the disc and for defining a narrow extrusion slot at the periphery of the disc, drive means including a shaft on said disc for rotating the disc at high speed so that the batter deposited thereon is extruded through the slot in the form of a thin outwardly moving sheet of batter for acting upon by the vacuum, and means for permitting deposit of the incoming batter from the inlet conduit onto the center portion of the disc while in contact with the vacuum atmosphere within the chamber so that the discharge rate at the slot is dependent upon the speed and substantially independent of the degree of vacuum, and means for cutting off flow in the inlet conduit and withdrawing the deaerated batter during the application of pressure.

9. In a deaerating machine for deaerating sausage batter or the like, the combination comprising an enclosed chamber, means for drawing a vacuum in said chamber, an annular impeller member having a narrow slot extending about the periphery thereof, means for rotating the impeller member at high speed, said impeller member being open at the top and presenting an annular edge, a stationary hood superimposed on the impeller member, a seal assembly interposed between said annular edge of the impeller member and the hood to define an enclosed space in the impeller member, and an inlet conduit for sausage batter penetrating said hood for depositing the sausage batter into the space within the impeller for extrusion thereof through the slot by the action of centrifugal force whereby any entrained air in the batter is at shallow depth for removal by the vacuum atmosphere in the chamber.

10. In a deaerating machine for deaerating sausage batter or the like, the combination comprising an enclosed chamber, means for drawing a vacuum in said chamber, an impeller disc arranged substantially horizontally in said chamber, means defining a pair of peripheral slots at the edge of said disc, means for rotating the disc, means for depositing non-deaerated batter on said disc, means for enclosing the periphery of the disc so that the sausage batter deposited on the disc is confined at the periphery thereof for the building up of centrifugal force therein sufficient to force the batter through said slots, a first annular deflector means arranged outwardly at the slots for opposing the flow of the outwardly moving streams of batter and for causing the streams to be diverted through a sharp angle following which the batter is slung from the edges of the first deflector means, and a second annular deflector means arranged radially outward from the first deflector means for receiving the outwardly slung sheets of the batter and for diverting the same through a sharp angle following which the batter is again slung outwardly in the form of thin outwardly flowing sheets.

11. In a deaerating machine for deaerating sausage batter or the like, the combination comprising an enclosed chamber, means for drawing a vacuum in said chamber, an impeller disc arranged substantially horizontally in said chamber and having a peripheral slot, means for conducting batter to said slot, means for rotating the disc for discharge of the batter by centrifugal force, and annular deflector means secured to the periphery of the disc for rotation therewith providing a plurality of steps so that the outwardly slung batter is deflected through a sharp angle accompanied by the thinning out of the stream a plurality of times before finaly being slung free of said disc.

References Cited by the Examiner

UNITED STATES PATENTS

| | | | |
|---|---|---|---|
| 1,853,682 | 4/32 | Hechenbleikner | 239—223 |
| 1,870,099 | 8/32 | Croan | 239—233 |
| 2,515,665 | 7/50 | Pieper | 239—233 |
| 3,036,332 | 5/62 | Townsend | 17—35 |
| 3,081,484 | 3/63 | Schnell | 17—35 |
| 3,108,319 | 10/63 | Thompson | 17—39 |

LUCIE H. LAUDENSLAGER, *Examiner*.

SAMUEL KOREN, *Primary Examiner*.